United States Patent
Barandiaran Salaberria

(10) Patent No.: US 6,511,056 B1
(45) Date of Patent: Jan. 28, 2003

(54) GAS FILLED CYLINDER

(75) Inventor: Javier Barandiaran Salaberria, San Sebastian (ES)

(73) Assignee: Gain Gas Technique, S.L., Lezo (ES)

( * ) Notice: Subject to any disclaimer, the term of this patent is extended or adjusted under 35 U.S.C. 154(b) by 0 days.

(21) Appl. No.: 09/868,658

(22) PCT Filed: Sep. 22, 2000

(86) PCT No.: PCT/ES00/00355

§ 371 (c)(1), (2), (4) Date: Oct. 3, 2001

(87) PCT Pub. No.: WO01/33100

PCT Pub. Date: May 10, 2001

(30) Foreign Application Priority Data

Nov. 4, 1999 (ES) ............................................. 9902416
Nov. 4, 1999 (ES) ............................................. 9902417

(51) Int. Cl.⁷ ............................. F16F 9/02; F16F 9/32
(52) U.S. Cl. ................................. 267/64.11; 267/64.12; 188/282.1; 188/322.17
(58) Field of Search ........................ 188/282.1, 322.19, 188/300, 322.17, 315, 322.14; 267/64.12, 131, 64.11; 92/169.4, 165 R, 168, 169.1; 297/344.19, DIG. 3; 248/631, 161; 16/66, 84

(56) References Cited

U.S. PATENT DOCUMENTS 4,728,084 A * 3/1988 Bauer et al. ............. 267/64.11
4,779,851 A * 10/1988 Bauer et al. ............. 267/64.12
5,273,259 A * 12/1993 Bauer et al. ............. 267/64.12
5,516,082 A * 5/1996 Barandiaran ............. 267/64.12
5,570,873 A * 11/1996 Bauer et al. ............. 267/64.12
5,988,605 A * 11/1999 Weisser et al. ........ 188/322.16

FOREIGN PATENT DOCUMENTS

EP 0014126 * 8/1980
GB 1331397 * 9/1973

* cited by examiner

Primary Examiner—Douglas C. Butler
(74) Attorney, Agent, or Firm—Jacobson Holman PLLC

(57) ABSTRACT

Gas shock-absorber including two concentric tubes with an intermediary chamber and valve plug, and with a shaft of which the head separates two internal chambers, at which extremity is connected the body to the shock-absorber. The valve plug has to parts in direct contact between each other; the sliding of part in the external tube takes place by a seal situated between an upper metal washer and a slot of the part. The washer has a central neck which is introduced into the cavity of part. The other part of the valve plug has cavities which are intended to reduce its weight. The head of the shaft which separates the internal chambers is made of plastic and presents an upper countersunk part wherein is housed an annular seal; a washer is provided on top of the head and the assembly is riveted.

3 Claims, 3 Drawing Sheets

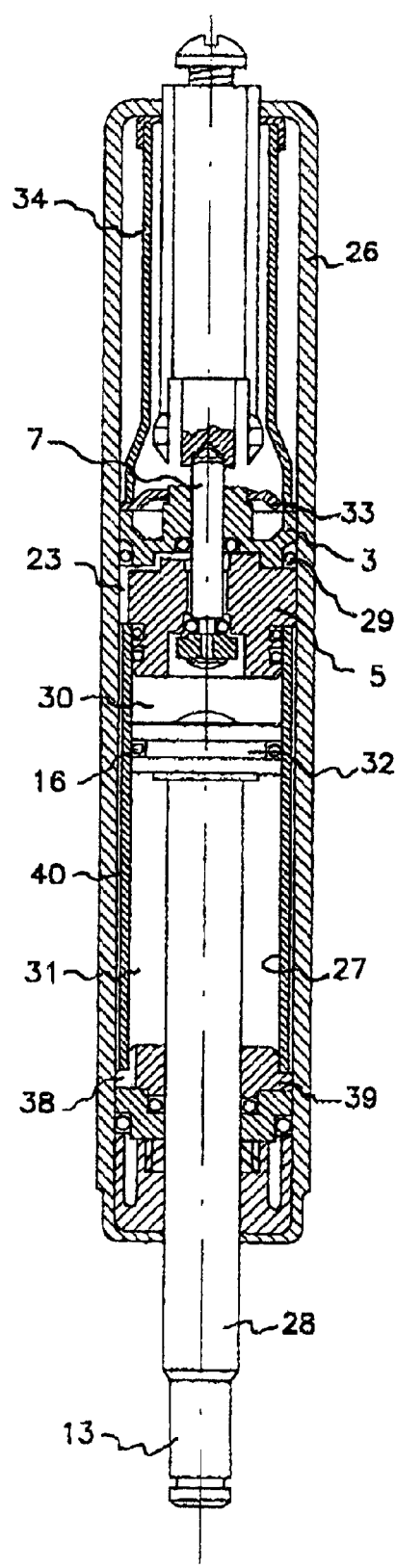
Fig:1

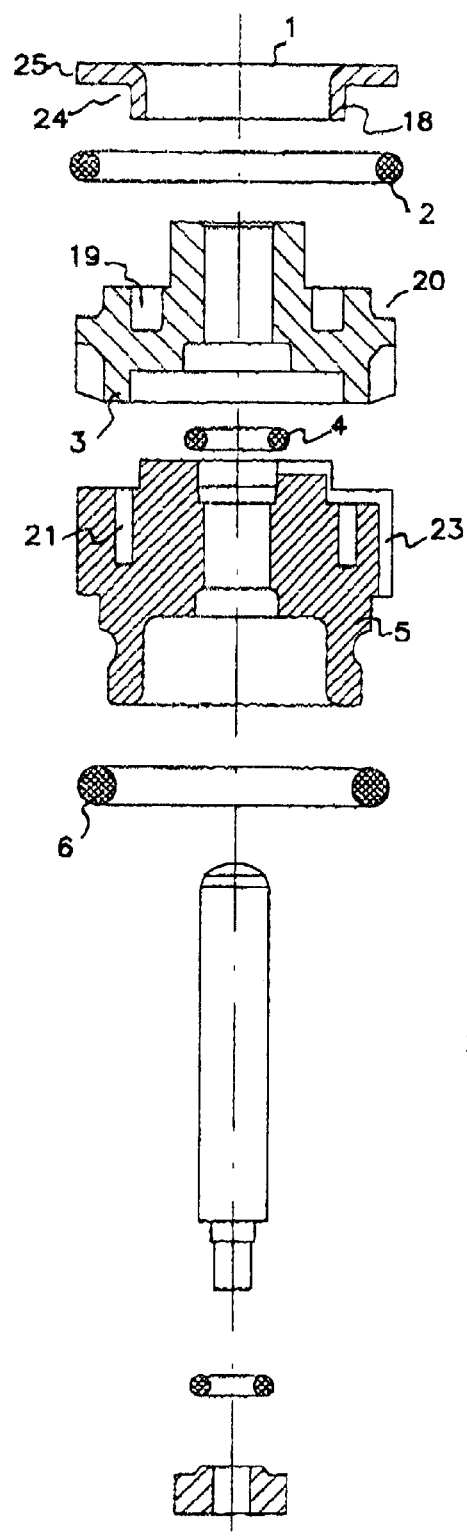
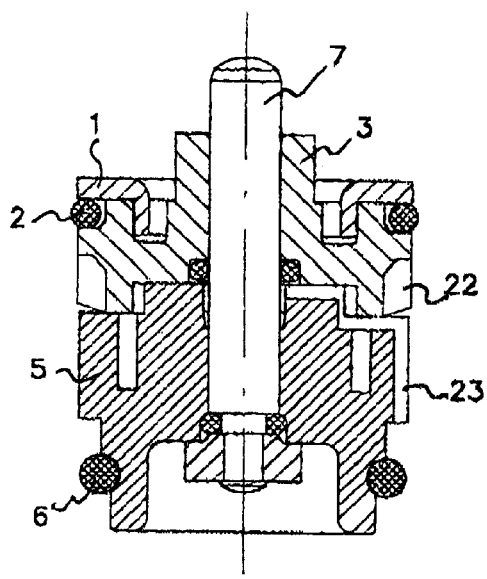
Fig:2  Fig:3

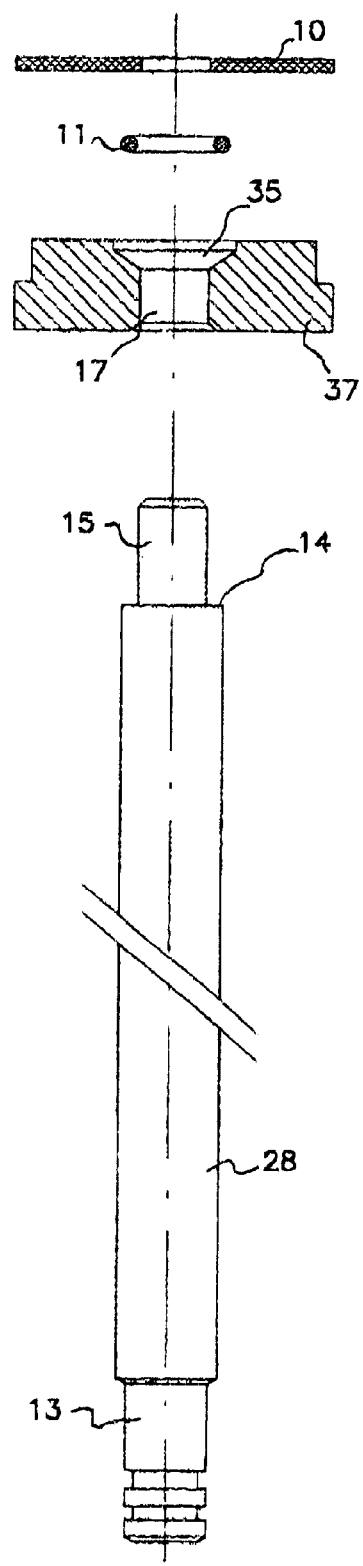
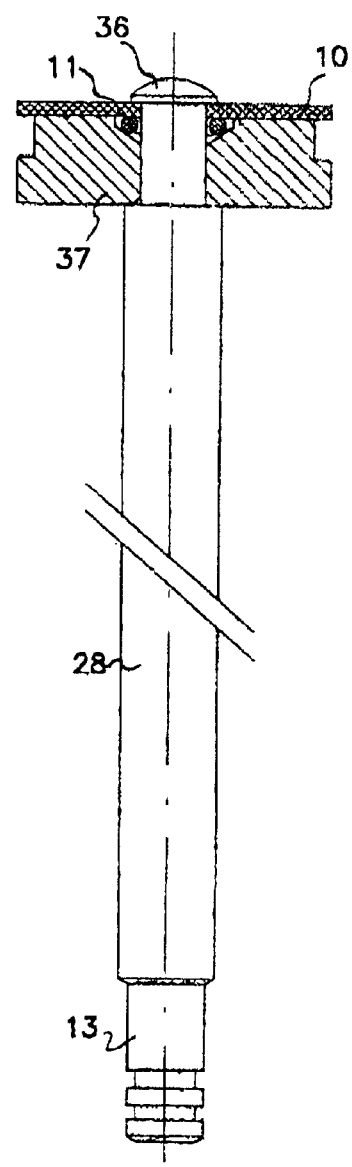
Fig:4     Fig:5

GAS FILLED CYLINDER

This application is a 371 of PCT/E500/00355 filed Sep. 22, 2000.

This invention relates to a gas filled cylinder of the type composed of two concentric tubes separated by a chamber and also separated by a valve plug and a shaft plug, arranged inside the outer tube and against which the inner tube is seated, A valve shaft passes through the valve plug, which, with its movements, allows the passage of gas to the interior of the inner tube. A piston connected to a shaft moves in this space, with the piston moving, together with the said shaft, according to the movement in question, and with the gas passing from one space to the other according to the direction of this movement.

Examples of cylinders of this type are known through FR-A-2661229 and EP-A-0634587. In these references and especially in the second one mentioned, the valve plug consists of two parts assembled together, between which the gradual passage of the gas is created towards the chamber between the tubes, while also forming an annular space in which a ring seal or sealing ring is arranged that makes contact with the interior of the outer tube for sealing purposes.

The two components of the valve plug make frontal contact with each other and it is the upper one which is provided with an annular slot for the sealing ring. In turn, this upper component receives at its top a washer which is supported on it, with an inner body of the cylinder itself being supported on this washer.

The cylinder shaft is a single part that includes the piston. This unit is produced by machining and a leaktight ring seal is later fitted to the head or piston.

In these techniques, there is the disadvantage that the leaktightness provided by the ring seal arranged between the two components of the valve plug is not as satisfactory as would be expected, given that the ring seal is not subjected to any flattening or pressure in order to act suitable against the wall of the outer tube.

Moreover, other disadvantages of known shafts of this type lie fundamentally in the need to carry out machining of a certain complexity and, of course, at a cost which is not insignificant.

One object of the invention is to provide a valve plug of he type described that provides a greater leak-tightness or sealing capacity of the plug and therefore greater safety in operation.

Another object of the invention is to provide a valve plug that lightens its weight.

Another object of the invention is to provide a valve plug that does not alter the cost of the manufactured product arid which, in addition, preserves and increases the service life of the components.

Another basic object of the invention is to provide a shaft for cylinders of this type that considerably reduces the machining.

Another object of the invention is to provide a shaft for gas filled cylinders that requires only simple to perform machining and is without any kind of technical complexity.

Finally, another object of the invention is to provide a shaft that is noticeably cheaper than conventional ones.

In order to achieve these objectives, the invention claims a valve plug consisting of two components assembled together with a stepped space between them in order to allow the passage of gas to the space between the tubes, with the particularity that this connection between both components is without any ring seal.

The ring in this case is transferred to the upper part above the upper component of the plug and between this and the washer that receives the inner body of the cylinder.

The washer is provided with a downwardly protruding neck from its central hole, and this neck becomes housed in an annular recess made in the upper part of the valve plug.

The washer presses against the ring seal as a result of the pressure that it receives from the inner body of the cylinder, so that this pressure is transmitted directly to the seal, causing it to become flattened and the pressure to be transmitted towards the exterior, thus adjusting it perfectly to the surface of the outer cylinder at all times.

Moreover, the lower body of the valve plug is provided with a wide cylindrically shaped cavity which is open downwards and which, without any detriment to the strength of the body, eliminates material and weight from the part.

In addition, the invention also claims a shaft composed of four separately produced parts, which are respectively, a shaft itself, a washer and a conventional ring seal and a part by way of a piston head, made of plastic material or similar.

The shaft is made starting from a basic cylindrical element, one of whose ends, the one that is connected to the item to be damped and obviously protrudes towards the exterior of the cylinder, is machined in the same way as the traditional shafts mentioned previously. The opposite end is carried out by making only one area of a smaller diameter for a certain length.

At this end which has been prepared in this way, the head of the piston, a circular crown shaped part, is housed, which at the edge of its central hole has a kind of countersinking on which a small ring seal rests.

This circular crown has a flat side surface area of the same diameter as the inner tube of the cylinder, through which it slides along the said inner surface.

A washer with the same interior diameter as he reduced diameter area of the shaft is placed above the latter part (the washer), with this washer placing pressure on the previously mentioned ring seal so that it fits perfectly to the shaft. In order to ensure this pressure and the consequent leak-tightness, the portion protruding from the reduced area of the shaft is riveted over the said washer, thus fixing the assembly and forming the shaft in accordance with the invention.

All these and other details of the invention can be appreciated in greater detail on the accompanying sheets of drawings, on which the following are represented:

FIG. 1 is a sectional elevation of a gas filled cylinder with a conventional shaft.

FIG. 2 is a development of the valve plug which is included in the invention.

FIG. 3 represents the valve plug shown in FIG. 2, now assembled.

FIG. 4 represents the extension of the cylinder shift, in accordance with the invention.

FIG. 5 shows the shaft in FIG. 3, now assembled.

Looking now at FIG. 1 we can observe the traditional arrangement of a cylinder consisting of an outer tube (26) and an inner tube (27), between which a chamber (40) is formed. The valve plug is composed of two bodies or sections, the upper one (3) and the lower one (5), suitably assembled together.

Between both, the stepped passage (23) for gas through the plug can be appreciated, so that a transfer of gas takes place through this passage and through the valve shaft (7), as well as through the passage (38) in the shaft plug (39), towards the interior of the cylinder, either towards the chamber (30) or towards the chamber (31), above or below the piston (32) connected to the protruding shaft (28), all in terms of the movement of the shaft.

In the plug we can observe the traditional ring seal (29) arranged between the two bodies (3, 5) of the plug as well as the upper washer (33) that is supported on the upper body (3) and receives the inner body (34).

In FIG. 2, and in accordance with the invention, we can appreciate the two components (3, 5) of the valve plug, with the upwardly open slot (19) in the body (3) and the upper washer (1) with a downwardly protruding neck (18). This washer has a side edge (25) on which the inner body (34) of the cylinder is supported and the lower side (24) that presses the ring seal (2) that will be housed in the recess (20) in the body (3) against the inner surface of the outer tube (26).

The neck (18) will be received in the slot (19) in the body (3) so that it becomes perfectly centred. The provision of the free cavities (21) in the lower body (5) will favour the lower weight of the valve plug assembly, without any detriment to its necessary resistance, as mentioned previously. The assembly is completed with the traditional items such as the shaft (7), the seals (4, 6, 8) and the closure part (9) at the lower end of the shaft.

The assembly in FIG. 3 allows us to appreciate the position of the sealing gasket (2) subjected to the pressure that will be appropriately transmitted to it by the washer (1) at all times, ensuring the continuous action of the said gasket against the inner surface of the outer tube (26) in order to provide the suitable leak-tightness of the valve plug.

Moreover, and with respect again to FIG. 1, we can check the known arrangement of the shaft (28) finished off by the piston (32) that includes the ring seal (16), in which the piston separates the two chambers (30,31).

In accordance with FIG. 4, we can appreciate this shaft, carried out according to the invention, which at its upper end has the disc (37) with a countersinking (35) which is, for example, trunco-conical, in which the ring seal (11) is housed and in turn goes round the end (15) of the shaft (28), above which is situated the washer (10), and with the said disc (37) being supported on the base (14).

Given that the length of the portion (15) of the shaft is slightly longer than the sum of the heights of the washer (10) and the disc (37), the shaft protrudes outside the assembly, so that the formation of the said shaft is achieved by riveting the said protruding portion.

The disc (37) has at least one part of its side surface perfectly cylindrical and of a diameter essentially identical to the diameter of the inner tube (27), thus facilitating the travel of the shaft through the inner chamber.

In the final arrangement shown in FIG. 5, the protruding head (36) of the shaft (28) can be appreciated, duly riveted, with which the unit becomes assembled, with the washer (10) putting pressure on the ring seal (11) for its adjustment on the portion (15) of the shaft in order to achieve perfect leak-tightness between the chambers (30, 31) of the cylinder.

What is claimed is:

1. Gas filled cylinder comprising:

two concentric tubes forming an intermediate chamber, with a valve plug with an upper washer and a shaft plug separating the tubes, forming two internal chambers separated by a head of a shaft protruding to an exterior that slides inside one of the tubes, with a valve shaft that passes through the valve plug, the upper washer that rests on the valve plug having a downward central neck that becomes housed in an upper circular recess provided in an upper body of the valve plug by way of a groove, while an upper edge of the upper body has an annular recess in which a ring seal is housed and is pressed by a body of the washer, providing a leak-tight adjustment against an inner wall of the other of the tubes, a lower body of the valve plug provided with a wide circular cavity that is open to the exterior towards a lower facing side of the upper body, an upper end of the shaft includes a part by way of a disc with a central trunco-conical countersinking in its top, in which a ring seal is received that adjusts to the end of the shaft, with a washer being fitted above this and with a riveted area of the shaft acting against the washer, fixing the disc and the washer and pressing the washer against the disc and against the shaft, the disc being supported at a lower end on a step on the shaft where an end starts and at least one portion of a side surface of the disc slides along an internal surface of the one tube.

2. Gas filled cylinder, in accordance with claim 1, wherein two portions of the valve plug, that make contact in their assembly, do so without any intermediate items in areas of greatest diameter.

3. Gas filled cylinder, in accordance with claim 1, wherein the washer is metallic and the disc is made of plastic material.

* * * * *